United States Patent [19]
Baird et al.

[11] Patent Number: 4,826,266
[45] Date of Patent: May 2, 1989

[54] CONDUCTIVE INFRARED WINDOW

[75] Inventors: Brian W. Baird, Santa Monica; Martin Levy, La Canada-Flintridge, both of Calif.

[73] Assignee: Lockheed Corporation, Calabasas, Calif.

[21] Appl. No.: 922,211

[22] Filed: Oct. 23, 1986

[51] Int. Cl.<sup>4</sup> ............................ G02B 1/02; H05B 3/14; H05K 9/00
[52] U.S. Cl. ..................... 350/1.1; 219/213; 219/522; 250/515.1
[58] Field of Search ................. 350/1.1; 219/203, 213, 219/219, 522, 543; 250/515.1

[56] References Cited

U.S. PATENT DOCUMENTS

| | | | |
|---|---|---|---|
| Re. 31,708 | 10/1984 | Gordon | 427/166 X |
| 3,896,474 | 7/1975 | Amelio et al. | 307/311 X |
| 4,000,346 | 12/1976 | Dowell | 427/164 X |
| 4,181,774 | 1/1980 | Wente | 428/335 |
| 4,265,974 | 5/1981 | Gordon | 427/164 X |
| 4,652,463 | 3/1987 | Peters | 427/162 X |

OTHER PUBLICATIONS

Hafner, H., et al., "Development of Gallium Arsenide for Infrared Windows," final report for period Jun. 25, 1975–Jun. 25, 1976 on contract F33615-75-C-5274, published Sep. 1975, Govt. Accession No. AD A 037336, report No. AFML-TR-76-163.

Steigmeier, E. et al., "Acoustical-Optical Phonon Scattering in Ge, Si, and III-V Compounds," *Physical Review*, vol. 141, No. 2, Jan. 1966, pp. 767-774.

"Gallium Arsenide Infrared Windows for High-Speed Airborne Applications", by M. J. Brau et al. (SPIE, vol. 29, Emerging Optical Materials, 1981).

*Primary Examiner*—John K. Corbin
*Assistant Examiner*—David J. Edmondson
*Attorney, Agent, or Firm*—Louis L. Dachs

[57] ABSTRACT

The invention is a window for transmitting infrared radiation for use with infrared systems, such as an infrared laser. In detail, the window comprises a polycrystalline silicon substrate doped with between $1 \times 10^{14}$ and $1 \times 10^{16}$ atoms per cubic centimeter of an n-type impurity. The impurities can be selected from the group consisting of Phosphorus, Arsenic, Antimony, Bismouth and Lithium. To reduce reflection, both sides of the sheet are coated with an antireflection coating. Sheet resistances of less than 25 ohms per square are obtainable while simultaneously providing excellent transmission in the infrared at both room and elevated temperatures. The internal heating produced by coupling the window to a source of electrical power can be used for deicing.

3 Claims, 3 Drawing Sheets

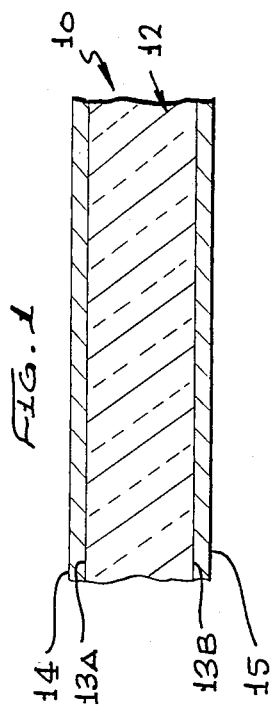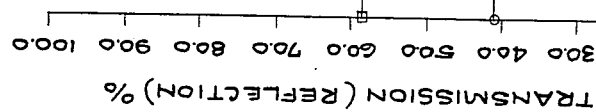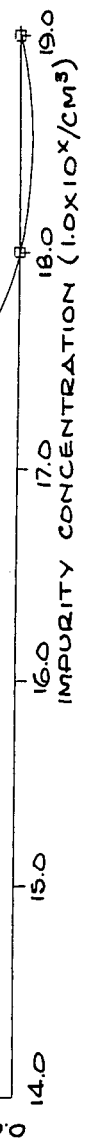

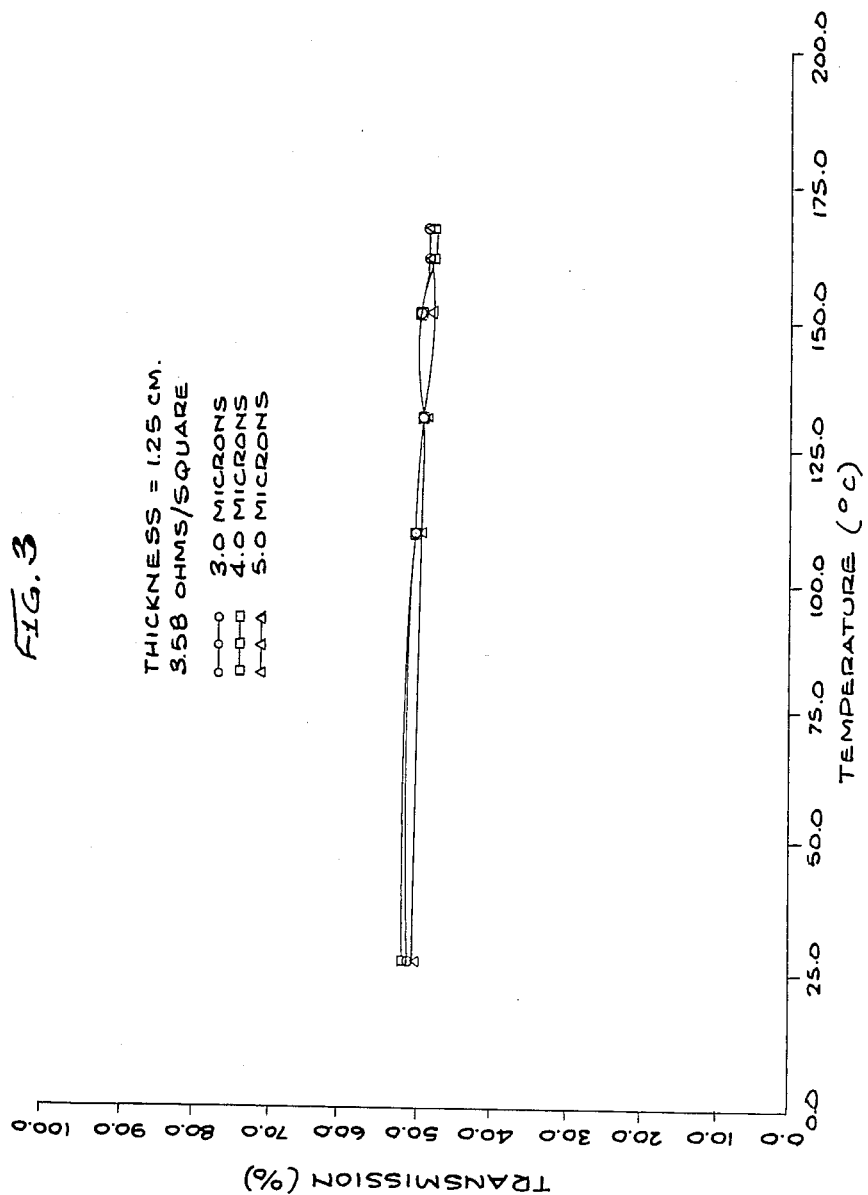

CONDUCTIVE INFRARED WINDOW

TECHNICAL FIELD

The invention relates to the field of windows for use with infrared systems, such as infrared lasers and, in particular, to a window which additionally provides electromagnetic interference protection.

BACKGROUND INFORMATION

On aircraft windows for use with internally mounted infrared systems, such as laser instruments and the like, the window must not only provide efficient transmission of the infrared radiation, but must be capable of providing electromagnetic interference (EMI) protection as well. It must also have the structural strength to withstand high aerodynamic loads induced by high speed flight. Furthermore, for velocities above Mach 2 the external skin temperature of the aircraft can rise to over 200° C. At these elevated temperatures the window must retain its optical, EMI protection, and structural properties. It should also have the capability of being deiced.

One approach of providing electromagnetic interference protection and/or deicing for infrared windows is to bond a wire grid with low sheet resistance across the external surface of the substrate. However, when high levels of EMI protection are required, the grid pattern becomes dense and infrared transmission is reduced. The grid also increases scatter and reduces the system modulation transfer function.

Another approach is to apply a conductive film across the glass substrate. This methos is disclosed in U.S. Pat. No. 4,181,774, "Electromagnetic Interference Filter Window" by J. P. Wente, et al. Here, a coating of indium-tin oxide is applied in a ratio of 10/90 having a thickness of 1,000 Å. The coating is applied by a conventional sputtering process and requires annealing at a temperature of 270° C. in the forming gas for one hour, followed by a five-hour anneal in air at 270° C. Thereafter conventional antireflection coatings are applied over both surfaces.

Such a conductive film can obtain 97 percent transmission at 1.06 microns for a sheet resistance of 100 ohms per square. However, this is an expensive process and the sheet resistance value obtained is not low enough for many applicaitons. Furthermore, such a thin conductive coating is easily damaged. Indium Tin Oxide is also strongly absorbing in the medium wave infrared and therefore is not usable for applications which require transmission in such wavelengths.

Another approach is to use an inherently conductive semiconductor as the infrared window substrate. Germanium, for example, is one of the most widely used materials for external infrared windows. Large plates are readily available with diameters of over 12 inches. However, this window material is not suitable for use in high temperature applications due to high absorption losses due to free carrier absorption at elevated temperatures. Gallium Arsenide (GaAs) is another inherently conductive infrared window material. In the paper entitled "Gallium Arsenide Infrared Windows for High-Speed Airborne Applications" by M.J. Brau et al. (SPIE Vol. 29, Emerging Optical Materials, 1981), a 2.8 mm sample which had been compensated with nickel to achieve good infrared transmission provided a sheet resistance of 140 ohms/square. Thicker samples, with the structural strength necessary to absorb aerodynamc loads, at high Mach numbers, would suffer greater transmission losses, particularly at elevated temperatures. In addition, the impurity compensation which is required to reduce inherent conductivity to acceptable levels, is sentitive to both temperatures and doping uniformity.

Accordingly, a primary object of this invention is to provide a material suitable for use as a window material for infrared systems.

Another object of this invention is to provide a window material which is capable of transmitting radiation in the infrared, while simultaneously providing a high level of electromagnetic interference protection.

A further object of this invention is to provide a window material which is capable of transmitting radiation in the infrared and which possesses the requisite strength and stability to withstand the stress and strain encountered within a military operational environment.

A still further object of this invention is to provide an infrared system window material that possesses high transmission of infrared radiation while operating in an environment with temperatures of 200° C. and above.

An additional object of this invention is to provide a window material that is capable of transmitting radiation in the infrared, while simultaneously providing both electromagnetic interference protection and/or deicing capability.

DISCLOSURE OF THE INVENTION

The invention is a window for transmitting infrared radiation. In detail, the invention comprises a normally insulating semiconductor substrate doped with n-type impurity atoms. These impurities endow the semiconductor substrate with the low sheet resistance required for electromagnetic interference protection and deicing. The impurity type and concentration is chosen to maintain high infrared transmission. In a specific implementation, the ivention comprises a polycrystalline silicon substrate doped with between $1 \times 10^{14}$ and $1 \times 10^{16}$ per cubic centimeter of n-type impurity atoms. Preferably the impurity is selected from the group consisting of Phosphorus, Arsenic, Antimony, Bismouth and Lithium. Preferably each side of the window is coated with an antireflection coating. This low cost window has excellent transmission characteristics in the medium wavelength infrared with sheet resistance of less than 25 ohms per square and is usable at temperatures to and above 200° C. By coupling the substrate to a source of electrical power the resistivity thereof will cause the window to heat providing deicing capability.

The novel features which are believed to be characteristic of the invention, both as to its organization and method of operation, together with further objects and advantages thereof, will be better understood from the following description in connection with the accompanying drawings in which presently preferred embodiments of the invention are illustrated by way of examples. It is to be expressly understood, however, that the drawings are for purposes of illustration and description only and are not intended as a definition of the limits of the invention. The internal heating produced by coupling the window to a source can be used for deicing.

BRIEF DESCRIPTION OF THE DRAWINGS

Illustrated in FIG. 1 is a partial cross-sectional view of the window.

Illustrated in FIG. 2 is a graph showing the transmission and reflection at a wavelength of 5 microns as a function of n-type impurity concentrations in a sample of the subject window.

Illustrated in FIG. 3 is a graph showing the transmission in the medium wavelength infrared versus temperature of a sample of the subject window.

Figure 4:
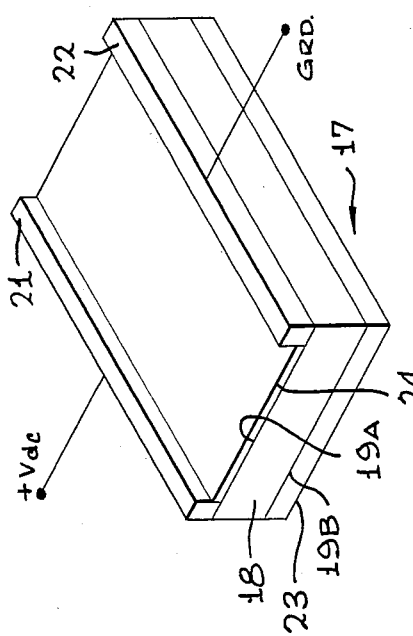

Illustrated in FIG. 4 is a graph of the insertion loss versus frequency for a sample of the subject window.

Figure 5:
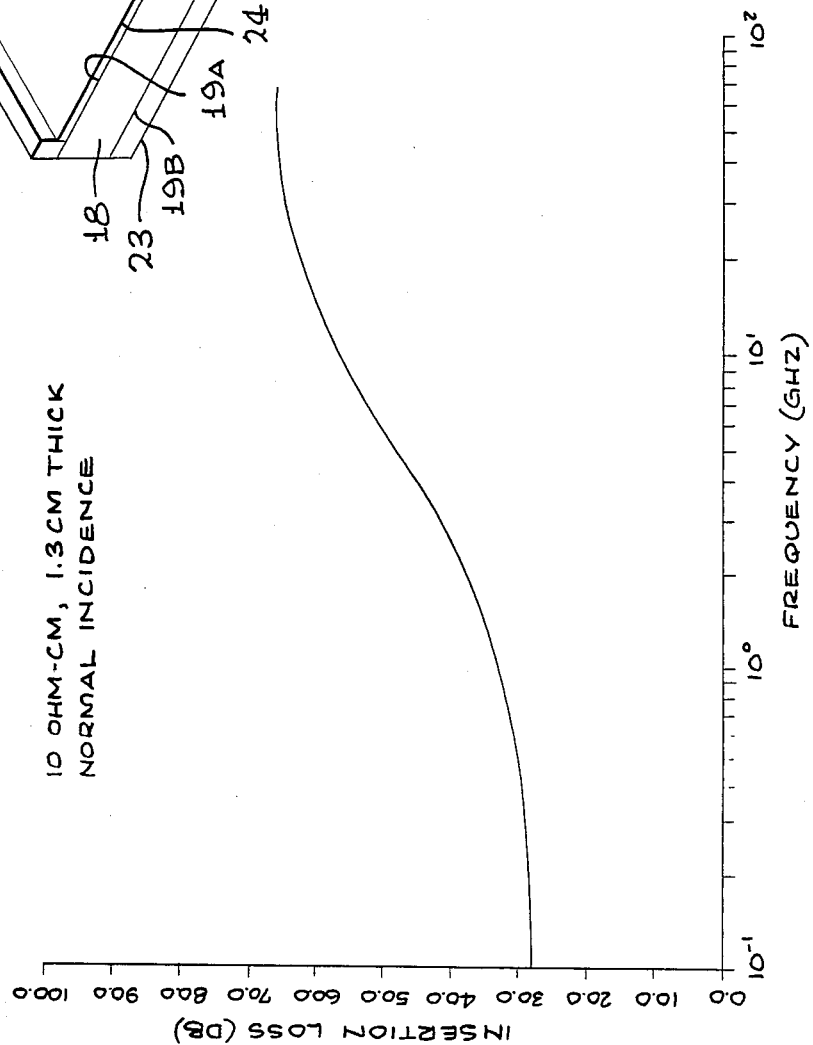

Illustrated in FIG. 5 is an isometric view of the window with attached bus bars for deicing applications.

BEST MODE FOR CARRYING OUT THE INVENTION

Illustrated in FIG. 1 is a partial cross-sectional view of the subject window, generally designated by numeral 10, for use with infrared instruments and systems such as infrared lasers. In detail, the window 10 comprises a polycrystalline silicon substrate 12 having first and second principle sides 13A and 13B, respectively. The silicon substrate 12 is doped with n-type (electron donor) impurities selected from the group consisting of Phosphorus, Arsenic, Antimony, Bismouth, and Lithium in the range of $1 \times 10^{14}$ and $1 \times 10^{16}$ atoms per cubic centimeter. The preferred impurity is Phosphorus. Zinc Selenide (ZnSe) and Zinc Sulphide (ZnS) are additional semiconductor substrate materials which are widely used in their normal insulating forms as windows for infrared imaging systems but which can also be made conductive by addition of n-type impurity atoms, thus enabling their usage for applications requiring EMI protection and/or deicing. To reduce reflection the substrate is coated on sides 13A and 13B, with a nonreflective coating 14 and 15, respectively. Such antireflection coatings are commercially available and there are a large number thereof. For example, a suitable antireflection coating is hard carbon coating No. OCLI6040011 manufactured by Optical Coating Lab Inc., Santa Rosa, Cal.

TEST RESULTS

Illustrated in FIG. 3 is a graph of the performance of a 1.25 centimeter thick sample of the window 10 which has been doped with approximately $10^{15}$ atoms of Phosphorus per cubic centimeter. This doping level provided a sheet resistence of 3.58 ohms per square. Plotted is the transmission versus temperature for 3.0, 4.0, and 5.0 micron wavelength infrared radiation. Note that the transmission is very uniform over a temperature range from room temperature (25° C.) to over 160° C.

Illustrated in FIG. 2 is a graph of the transmission and reflection versus impurity concentration for a 1.25 centimeter thick window for 5.0 micron infrared radiation at an incident angle of 65 degrees. It can be seen that the transmission remains relatively constant from $1 \times 10^{14}$ and $1 \times 10^{16}$ atoms per cubic centimeter which is considered the usable range. These graphs are typical of the performance of the subject invention at room and elevated temperatures.

Illustrated in FIG. 4 is a graph of the insertion loss versus frequency for a 1.3 centimeters thick sample with a sheet resistance of 7.1 ohms per square. It can be seen that the insertion loss is 28 dB at 100 $MH_Z$ and 57 dB at 10 $GH_Z$. This level of EMI shielding is sufficient for most applications.

Illustrated in FIG. 5 is an isometric view of a window, generally designated by numeral 17. The window 17 comprises a polycrystalline silicon substate 18 similar to substrate 12 illustrated in FIG. 1, having first and second principle sides 19A an 19B, respectively. Nickel bus 21 and 22 are deposited on side 19A. To reduce reflection the substrate is coated on sides 19A and 19B with a nonreflective coating, 23 and 24. By coupling the bus bars 21 and 22 to a source of electrical power the resistive substrate 18 will be heated, thus, providing deicing capability.

SUMMARY OF ADVANTAGES

Thus, it is readily apparent that the subject window has the following advantages.

(1) The elimination of conductive coatings and/or wire grids.

(2) Lower cost since polycrystalline silicon windows are inexpensive to manufacture.

(3) Extremely low sheet resistance values are available.

(4) Good transmission characteristics at both room and elevated temperatures are provided.

(5) Excellent EMI protection.

(6) Excellent deicing properties.

While the invention has been described with reference to particular embodiments, it should be understood that the embodiments are merely illustrative as there are numerous variations and modifications which may be made by those skilled in the art. Thus, the invention is to be construed as being limited only by the spirit and scope of the appended claims.

INDUSTRIAL APPLICABILITY

The invention has applicability for use as a protective window for transmission of infrared radiation by laser systems, while providing a high level of electromagnetic interference protection and/or integral deicing capability.

We claim:

1. A window for transmitting light from an infrared system comprising a normally insulating polycrystalline silicon substrate having first and second sides and doped with between $1 \times 10^{14}$ and $1 \times 10^{16}$ atoms per cubic centimeter of an n-type impurity.

2. The window as set forth in claim 1 wherein the n-type impurity is selected from the group consisting of Phosphorus, Arsenic, Antimony, Bismouth and Lithium.

3. The window as set forth in claim 2 wherein the first and second sides of said substrate are coated with an antireflective coating.

* * * * *